Figure 1:
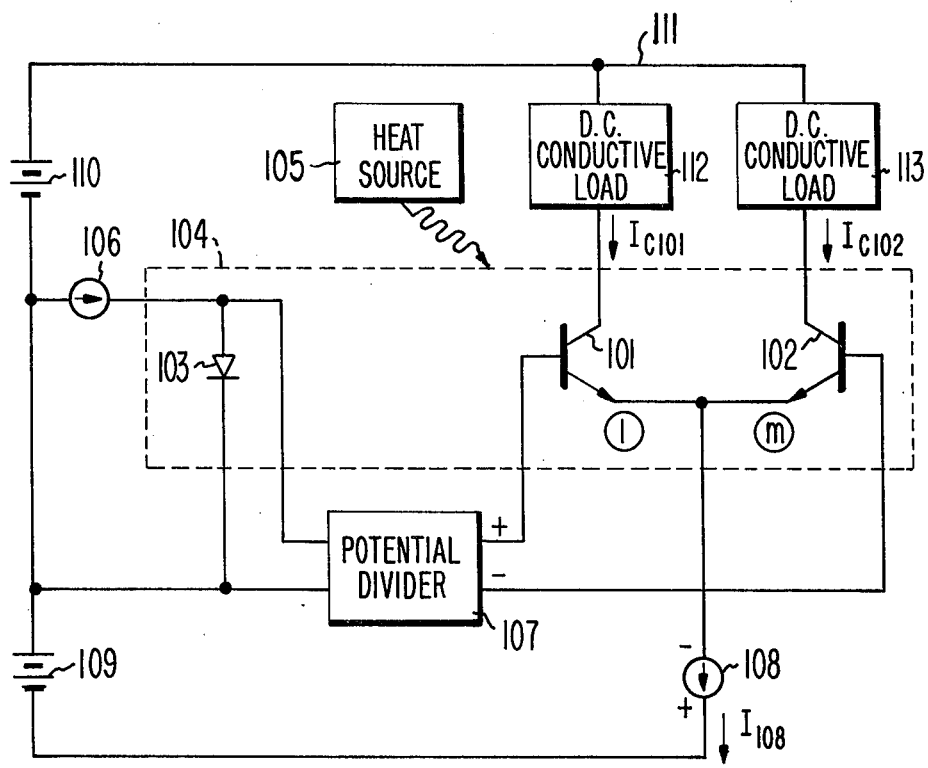

United States Patent [19]
Crowle

[11] 4,021,722
[45] May 3, 1977

[54] TEMPERATURE-SENSITIVE CURRENT DIVIDER

[75] Inventor: Brian Crowle, Ashford, England

[73] Assignee: RCA Corporation, New York, N.Y.

[22] Filed: Oct. 24, 1975

[21] Appl. No.: 625,559

[30] Foreign Application Priority Data
Nov. 4, 1974 United Kingdom ............ 47592/74

[52] U.S. Cl. ............................... 323/4; 73/362 SC; 219/501; 323/19
[51] Int. Cl.² ....................................... G05D 23/20
[58] Field of Search ............... 73/362 SC; 307/296, 307/297, 310; 323/1, 4, 16, 19, 22 T, 68; 330/22; 219/501

[56] References Cited
UNITED STATES PATENTS

| | | |
|---|---|---|
| 3,851,241 | 11/1974 | Wheatley .......................... 323/19 X |
| 3,882,728 | 5/1975 | Wittlinger ....................... 307/310 X |
| 3,914,684 | 10/1975 | Leidich ................................. 323/4 |

*Primary Examiner*—A. D. Pellinen
*Attorney, Agent, or Firm*—H. Christoffersen; S. Cohen; A. L. R. Limberg

[57] ABSTRACT

A pair of transistors have interconnected emitters connected to a constant-current supply which determines the combined values of their emitter currents--and thus of their collector currents. The ratio between their collector currents is controlled by the temperature at which they and an auxiliary forward-biased semiconductor junction are operated, the base electrodes being differentially biased by a fraction of the potential developed across the auxiliary semiconductor junction.

5 Claims, 2 Drawing Figures

TEMPERATURE-SENSITIVE CURRENT DIVIDER

The present invention concerns a temperature-sensitive current divider.

Temperature-insensitive current dividers comprising a pair of transistors receiving an input current at the interconnection of their emitter electrodes are known from U.S. Pat. No. 3,867,685 (Ahmed). A potential linearly proportional to the absolute temperature of the transistors is applied between the base electrodes of the transistors in such a divider to determine the apportioning of the input current between the emitter-to-collector paths of the transistors.

U.S. Pat. No. 3,809,929 (Vittoz) is directed to a temperature sensing device wherein the bias potential developed across a forward-biased semiconductor junction is scaled down for application between the base electrodes of two grounded -emitter amplifiers.

In the present invention, a fraction of the offset potential across a forward-biased semiconductor junction, which decreases or increases as temperature decreases or increases, is applied between the base electrodes of a pair of transistors receiving an input current at the interconnection of their emitter electrodes. This provides a current divider with pronounced and well-defined sensitivity to temperature, useful in developing direct or alternating currents of prescribed magnitude as a function of temperature.

Figure 2:
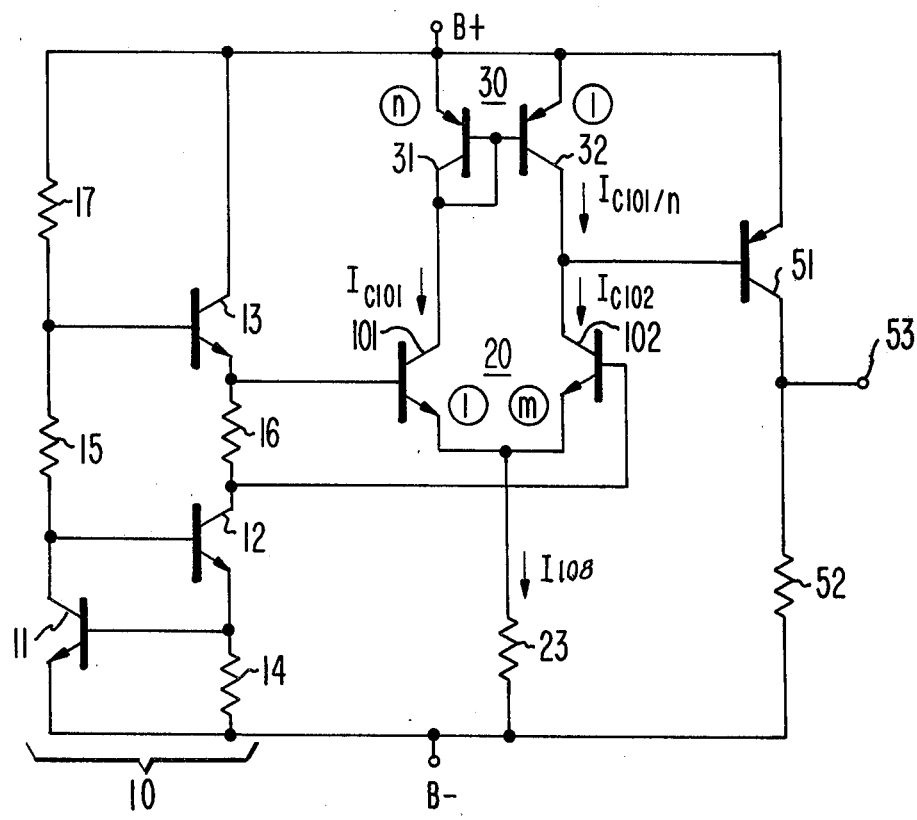

In the drawing:

FIG. 1 is a schematic diagram, partially in block form, of a temperature-sensitive current divider embodying the present invention; and FIG. 2 is a schematic diagram of a temperature-sensitive current divider connected to switch a transistor from non-conduction to conduction whenever a threshold value of temperature is exceeded, which current divider embodies the present invention.

In FIG. 1, transistors 101 and 102 and an auxiliary semiconductor junction 103 of the same basic semiconductor material (e.g., silicon) are arranged in a common thermal environment 104, that is, they are at substantially the same temperature, T. This temperature is determined by thermal coupling of a heat source 105 to the common thermal environment 104, which thermal coupling is indicated by the wavy arrow between elements 104 and 105. A common thermal environment 104 can be obtained by locating elements 101, 102, 103 proximately on a monolithic integrated circuit, for example.

Auxiliary semiconductor junction 103 preferably is the base-emitter junction of a transistor, which is self-biased by collector-to-base feedback. In any case, this junction 103 is forward-biased, which is done in FIG. 1 by current from a current source 106. The bias potential appearing across junction 103 responsive to this forward bias current is scaled down by a fixed factor (e.g., by a potential divider 107, as shown) to obtain a fraction of this bias potential. This fraction, which exhibits the same percentage decrease per degree of increase in temperature T as the bias potential across junction 103 does, is applied between the base electrodes of transistors 101 and 102.

Transistors 101 and 102 have their combined emitter current flows determined by a constant-current source 108, which has its first terminal connected to an interconnection of their emitter electrodes. Constant-current source 108 has first and second terminals of opposite polarity and seeks to cause a prescribed current flow $I_{108}$ in any external path connected between them. $I_{108}$ includes a direct component and in various embodiments of this invention may or may not further include a changing signal component superimposed on its direct component. The characterization of source 108 as a "constant-current" source refers to the magnitude of the current it provides not being appreciably affected by the expected changes in the currents and potentials of the circuitry with which it is associated. The second terminal of source 108 is direct current conductively coupled through voltage supplies 109 and 110 to a node 111 and thence, through load 112 to the collector electrode of transistor 101 and through load 113 to the collector electrode of transistor 102. Voltage supplies 109 and 110 are used to bias the electrodes of each of transistors 101 and 102 relative to each other to condition the transistor for conventional transistor action.

Transistors 101 and 102 are, accordingly, connected as a current divider with a first portion $I_{C101}$ of $I_{108}$ flowing through the collector-emitter path of transistor 101 and a second portion $I_{C102}$, through the collector-emitter path of transistor 102. Except for the relatively negligible base currents of transistors 101 and 102, $I_{C101}$ and $I_{C102}$ together constitute the entirety of $I_{108}$. One can, as taught in U.S. Pat. No. 3,867,685, show, by proceeding from the standard equation describing normal transistor action that the ratio between the respective collector currents $I_{C101}$ and $I_{C102}$ of transistors 101 and 102 varies as follows as a function of the potential $\Delta V_{BE}$ between their base electrodes.

$$\Delta V_{BE} = (kT/q)\ln(mI_{C101}/I_{C102}) \qquad 1$$

where
- $k$ is Boltzmann's constant,
- $q$ is the charge on an electron, and
- $m$ is the ratio of the effective areas of the base-emitter junctions of transistors 102 and 101. (In the drawing, the encircled $l$ and $m$ near the emitter electrodes of transistor 101 and of transistor 102, respectively, indicate the relative areas of their respective base-emitter junctions.) Equation 1 indicates that a differential potential $\Delta V_{BE}$ which increases linearly with the temperature T must be applied between the base electrodes of transistors 101 and 102 in order that $I_{C101}/I_{C102}$ remain constant.

This is not done, however, in the present invention. Instead, a fraction of the bias potential across junction 103, which bias potential decreases with temperature increase is applied between the base electrodes of transistors 101 and 102. This causes $I_{C101}$ to decrease with increasing temperature and $I_{C102}$ to increase with increasing temperature. Each of these current changes may be applied to a load, as shown, or alternatively one of the loads 112 and 113 may be replaced by direct connection and only one of the temperature-dependent currents utilized.

The present invention can be used, for example, to control the temperature of an electric oven by degenerative feedback. The heat source 105 may be considered the interior of the oven. Constant-current source 108 provides an $I_{108}$ with an a-c component. The response to this a-c component appearing across load 112 is coupled to control the flow of power to the oven. As the oven heats up, the temperature-sensitive current divider reduces the flow of power to the oven, tending to stabilize its temperature.

FIG. 2 shows a temperature-sensitive current divider circuit designed to be included in a monolithic integrated-circuit power amplifier to interrupt the application of input signal to the power output transistors of the amplifier when the amplifier is over-heated. The configuration 10 is used to apply a fraction of the bias potential developed across the base-emitter junction (103) of transistor 11 between the base electrodes of transistors 101 and 102. More particularly, elements 11, 12, 14, 15 and 17 are connected in an integrated circuit biasing arrangement for supplying $V_{BE}$ bias voltage, which bias voltage is supplied across resistor 14, as described in U.S. Pat. No. 3,430,155.

The relative resistances of resistors 15 and 17 are chosen so the potential drop across resistor 15 is sufficiently large (about a volt or more) so that the collector-base junction of transistor 12 is reverse-biased. The current flows through resistors 16 and 14 are substantially equal-valued so $\Delta V_{BE}$ developed as a potential drop across resistor 16 is $p = R_{16}/R_{14}$ times the base-emitter offset potential of transistor 11, where $R_{16}$ and $R_{14}$ are the resistances of resistors 16 and 14, respectively.

The operating potential between the B+ and B− terminals is maintained constant and substantially larger than the combined base-emitter offset potentials of transistors 11 and 12 (each about 0.7 volts). So, a substantially constant current flows through resistors 15 and 17. The combined resistance of 15 and 17 is advantageously chosen such that the emitter currents of 11 and 12 are approximately equal. (Alternatively, resistor 17 may be replaced by a constant-current supply.)

The precentage variation of the potential at the joined electrodes of transistors 101 and 102 is small so resistor 23 acts as a constant-current source, the current flow therethrough being determined in accordance with Ohm's Law. The resistance of 23 in this application is not critical, and need only be chosen with a view to setting current levels in 20 and 30 appropriate to the transistors used.

The transconductances of transistors 101, 102 are so chosen that when equal base-emitter voltages are applied to both transistors, the emitter current in 102 is m times that in 101. The collector electrodes of transistors 101 and 102 are connected to the input terminal and to the output terminal, respectively, of a current mirror amplifier 30. The transconductances of transistors 31 and 32 in current mirror amplifier 30 are so chosen that the emitter current ratio of 31 to 32 is n. That is, the gain of current mirror amplifier 30, used as a balanced-to-single-ended-signal converter, is −1/n.

At temperatures below a threshold value $T_T$, the output current $I_{C101}/n$ which transistor 32 seeks to provide exceeds $I_{C102}$. So, transistor 32 saturates and insufficient forward-bias potential is applied to transistor 51 to render it conductive. Resistor 52 couples potential from the B-terminal to output terminal 53. At temperatures above $T_T$, $I_{C102}$ demanded by transistor 102 exceeds the $I_{C101}/n$ current supplied by transistor 32 of amplifier 30. The excess demand is met by base current from transistor 51 biasing it into conduction and raising the potential at output terminal 53 to a value close to the B+ potential. The power amplifier (not shown) associated with the FIG. 2 circuit is arranged to have its input signal interrupted only when the potential at terminal 53 has this more positive value.

Table (1) below tabulates values of $T_T$ for a selected range of ratios p, m and n assuming the base-emitter potential $V_{BELL}$ of transistor 11 to be 700 mV at 25° C, and to fall linearly at 1.93 mV/° C rise. Entries in the table are in ° C and were determined from the intersections of $V_{BELL}$ and various $\Delta V_{BE}$'s for differing values of $I_{C101}/I_{C102} = n$, all plotted on the same graph as functions of temperature.

TABLE 1

| p<br>mn | 3 | 4 | 5 | 6 | 7 | 8 |
|---|---|---|---|---|---|---|
| 9 | 238 | 201 | 179 | 143 | 119 | 97 |
| 16 | 208 | 169 | 135 | 106 | 81 | 59 |
| 20 | 199 | 157 | 123 | 93 | 68 | 46 |
| 25 | 189 | 147 | 111 | 82 | 56 | 34 |

The accuracy to which the above figures will agree in practice with measured values depends on the accuracy to which the ratios p, m and n, together with $V_{BELL}$, meet the design values. Errors may be estimated from the results of partial differentiation.

By way of example, let $m\ n = 16$, $p = 4$, and let a $V_{BELL}$ of 700 mV/° C, with a temperature coefficient of 1.93 mV/° C. The predicted changeover temperature is 169° C from Table (1), subject to the following errors:

+2.2° C per +1% error in base-emitter voltage at 25° C.

−0.45° C per +1% error in mn.

−1.5° C per +1% error in p.

−2.5° C per +1% error in the temperature coefficient of base-emitter voltage. In addition, errors due to imbalance in the differential amplifier can arise. The cumulative effects of these errors are acceptable in protecting an audio power amplifier from overheating.

If the circuit is constructed as a monolithic integrated circuit, better accuracy can be obtained, practically speaking, if the ratios m and n are integers. Making m an integer permits the larger transconductance transistor 102 to be made up of parallelled transistors each like transistor 101; this construction prevents the edge effects in the base-emitter junctions of transistors 101 and 102 from affecting the accuracy of the proportion between the relative transconductances. Making n an integer permits the larger transconductance transistor 31 to be made of parallelled transistors each like transistor 32, which is similarly advantageous. Practically speaking, better accuracy can be obtained as the ratio P is chosen as an integer and preferable as a perfect square. This permits resistors 14 and 16 to be made up from series and parallel combinations of equal resistors, which can be matched very accurately and produce a ratio which is only slightly dependant on processing variation.

What is claimed is:

1. A current divider for dividing current in response to temperature, said current divider comprising:
   first and second transistors of the same conductivity type, each having base and emitter electrodes with a base-emitter junction therebetween arranged to be operated substantially at said temperature and having a collector electrode;
   means responsive to said temperature for applying a negative-temperature-coefficient potential between the respective base electrodes of said first and said second transistors;

a constant-current source having positive and negative terminals, a first of which is connected to an interconnection between the emitter electrodes of said first and said second transistors to forward bias their respective base-emitter junctions;

first direct current conductive means connecting the collector electrode of said first transistor to the second of the positive and negative terminals of said constant current source, through which a temperature-sensitive first fraction of current from said constant-current source flows;

second direct current conductive means connecting the collector electrode of said second transistor to said second terminal of said constant-current source, through which a temperature-sensitive second fraction of current from said constant current source flows.

2. A circuit as claimed in claim 1 wherein said means for applying a negative-temperature-coefficient potential includes:

an auxiliary semiconductor junction arranged to be operated substantially at said temperature;

means for applying a substantially constant forward-biasing current to said auxiliary semiconductor junction, thereby to develop a bias potential across said auxiliary semiconductor junction, which bias potential respectively increases and decreases with decrease and increase in said temperature; and means for scaling down said bias potential to obtain a fixed fraction thereof, which fraction is applied as a differential potential between the respective base electrodes of said first and said second transistors.

3. A current divider as set forth in claim 2 in combination with:

differential comparing means having a first input circuit included in said first direct current conductive means for receiving said first fraction of current, having a second output circuit included in said second direct current conductive means for receiving said section fraction of current, and having an output circuit where responsive to a predetermined portion of said first fraction of current being smaller than or larger than a predetermined portion of said second fraction of current an indication is provided of whether said temperature is above or below a predetermined value.

4. A circuit providing an output current responsive to temperature, said circuit comprising:

first and second transistors of the same conductivity type, each having base and emitter electrodes with a base-emitter junction therebetween arranged to be operated substantially at said temperature and having a collector electrode, said first transistor being designed to have a collector current m times as large as said second transistor for the same values of base-emitter potential;

means responsive to said temperature for applying a negative-temperature-coefficient potential between the respective base electrodes of said first and said second transistors;

a current amplifier having an input terminal to which the collector electrode of said first transistor is direct coupled, having an output terminal and exhibiting a current gain of −G between its input and output terminals, where G is a positive number;

means for applying current to an interconnection of the emitter electrodes of said first and said second transistors of a polarity tending to forward-bias the base-emitter junctions of said first and said second transistors; and a terminal for supplying said output current, to which the collector electrode of said second transistor and the output terminal of said current amplifier are direct coupled.

5. A circuit as claimed in claim 4 wherein said means for applying a negative-temperature-coefficient potential includes:

an auxiliary semiconductor junction arranged to be operated substantially at said temperature;

means for applying a substantially constant forward-biasing current to said auxiliary semiconductor junction, thereby to develop a bias potential across said auxiliary semiconductor junction, which bias potential respectively increases and decreases with decrease and increase in said temperature; and means for scaling down said bias potential to obtain a fixed fraction thereof, which fraction is applied as a differential potential between the respective base electrodes of said first and said second transistors.

* * * * *